(12) United States Patent
Sloan et al.

(10) Patent No.: US 8,574,042 B1
(45) Date of Patent: Nov. 5, 2013

(54) GAME CLEANING SYSTEM

(76) Inventors: Troy Sloan, Jane Lew, WV (US); John A. Jacobin, II, Rivesville, WV (US)

( * ) Notice: Subject to any disclaimer, the term of this patent is extended or adjusted under 35 U.S.C. 154(b) by 0 days.

(21) Appl. No.: 13/584,768

(22) Filed: Aug. 13, 2012

Related U.S. Application Data

(60) Provisional application No. 61/522,435, filed on Aug. 11, 2011.

(51) Int. Cl.
*A22B 5/16* (2006.01)
(52) U.S. Cl.
USPC ............................................. 452/128
(58) Field of Classification Search
USPC ........................................ 452/125, 127–130
See application file for complete search history.

(56) References Cited

U.S. PATENT DOCUMENTS

| | | | |
|---|---|---|---|
| 4,860,404 A * | 8/1989 | Flachs | 452/187 |
| 5,211,601 A * | 5/1993 | Cope | 452/187 |
| 6,626,748 B2 * | 9/2003 | Homer, Sr. | 452/189 |
| 7,059,956 B1 * | 6/2006 | Summerlin | 452/192 |
| 7,261,631 B1 * | 8/2007 | Golson, Sr. | 452/187 |
| 7,625,269 B2 * | 12/2009 | Godwin | 452/129 |
| 7,806,755 B1 * | 10/2010 | Martinelli et al. | 452/187 |
| 8,210,912 B2 * | 7/2012 | Ugiansky | 452/187 |

* cited by examiner

*Primary Examiner* — Richard Price, Jr.
(74) *Attorney, Agent, or Firm* — Pearne & Gordon LLP

(57) ABSTRACT

An apparatus for removing a portion of a hide from an animal is provided. The apparatus includes a base, and a tether that is adjustable relative to the base. A hide connector is included, and cooperates with a portion of loose hide that extends from the animal, but is connected to a remaining portion of the hide on the animal that is to be removed. An animal connector cooperates with a portion of the animal. One of the hide connector and the animal connector is coupled to the base and the other one of the hide connector and the animal connector is coupled to the tether. A driver is provided to adjust a position of the tether relative to the base and cause separation of the hide connector and the animal connector, thereby removing at least some of the remaining portion of the hide from the animal.

14 Claims, 7 Drawing Sheets

GAME CLEANING SYSTEM

CROSS-REFERENCE TO RELATED APPLICATIONS

This application claims the benefit of U.S. Provisional Application No. 61/522,435, filed Aug. 11, 2011, which is incorporated in its entirety herein by reference.

BACKGROUND OF THE INVENTION

1. Field of the Invention

This application relates generally to a system and method for cleaning animals and, more specifically, to a system and method of removing skin from an animal.

2. Description of Related Art

Conventional systems and methods for removing the skin, interchangeably referred to herein and in the figures as the hide of a dead animal are laborious and often result in fur or other objects coming into contact with the exposed portions of the animal that were previously concealed by skin. The animal carcass to be skinned is typically suspended and the entire hide to be removed is pulled away from the animal while being cut off with a knife. Fur or other objects from the removed hide may get blown back onto the now exposed portions of the animal, which can be covered in blood or other bodily fluids, causing the fur to adhere to the animal. Removing such objects requires even more tie and effort on the part of the person skinning the animal.

BRIEF SUMMARY OF THE INVENTION

According to one aspect, the subject application involves an apparatus for removing a portion of a hide from an animal. The apparatus includes a base, and a tether that is adjustable relative to the base. A hide connector is included, and cooperates with a portion of loose hide that extends from the animal, but is connected to a remaining portion of the hide on the animal that is to be removed. An animal connector cooperates with a portion of the animal. One of the hide connector and the animal connector is coupled to the base and the other one of the hide connector and the animal connector is coupled to the tether. A driver is provided to adjust a position of the tether relative to the base and cause separation of the hide connector and the animal connector, thereby removing at least some of the remaining portion of the hide from the animal.

According to another aspect, the subject application includes a hide connector coupled to the base at a generally-fixed location relative to the base, and an animal connector coupled to the tether. Operation of the driver applies a tensile force on the tether to cause separation of the animal connector and the hide connector, thereby pulling the animal generally away from the hide connector.

The hide connector can optionally include a clamp with a generally fixed jaw and an adjustable jaw. Movement of the adjustable jaw toward the fixed jaw applies a compressive force on the portion of loose hide.

The game cleaning apparatus can also optionally include at least one upright supported by the base and extending generally upwardly, away from the base. For such an embodiment, a portion of the tether is suspended adjacent to an elevated portion of the upright and operation of the driver causes at least one of the portion of loose hide and the animal to be pulled toward a plane of the elevated portion of the upright above the base. An elevated member can also optionally be positioned adjacent to the elevated portion of the upright, supporting a transitional lifting device such as a pulley. In that case, the tether extends at least partially over the transitional lifting device between the driver and the animal connector.

According to another aspect, the subject application includes an apparatus for removing a portion of a hide from an animal. The apparatus includes a base, and a plurality of uprights extending in an upwardly direction, generally away from the base. An elevated member is supported adjacent to an elevated portion of the uprights in a plane disposed vertically above a plane of the base, and supports a pulley. A tether extends over the pulley and includes a first connector adjacent to a distal end thereof, and a second connector is coupled to the base at a generally-fixed location relative to the base. A driver is operable to apply a tensile force to the tether extending over the pulley, and elevate the first connector provided adjacent to the distal end of the tether, thereby causing separation of the first and second connectors.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION

Figure 1:
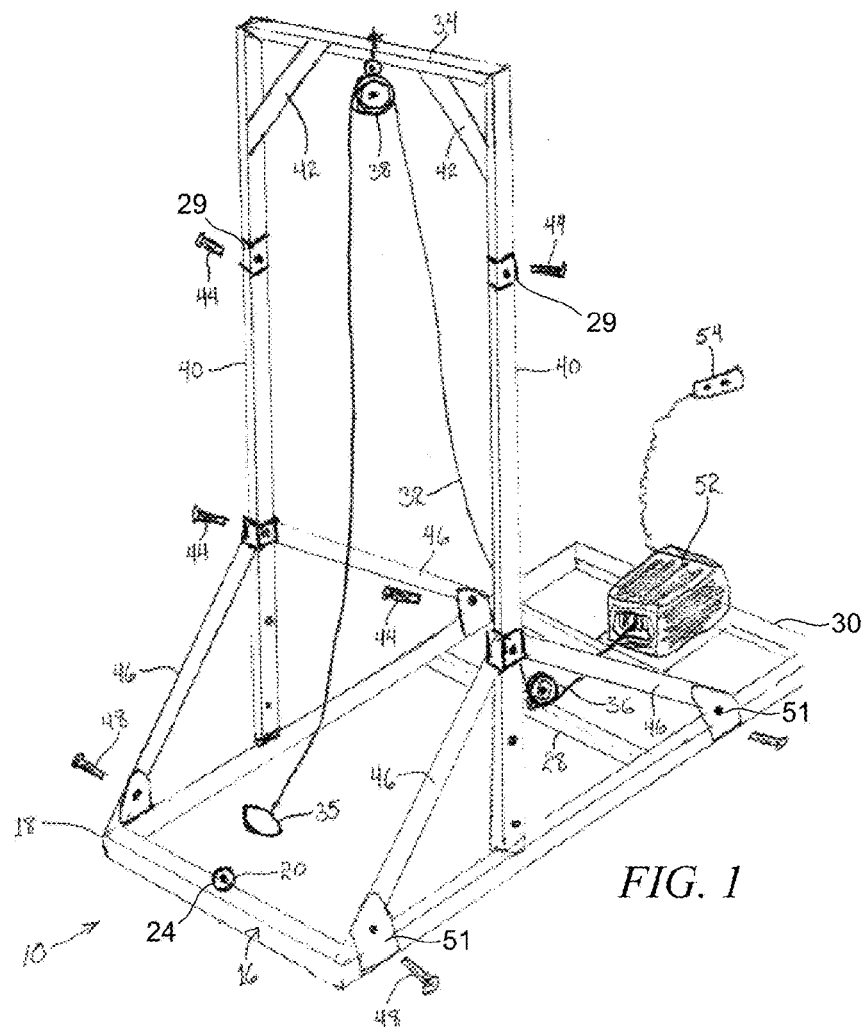
FIG. 1 is a perspective view of an illustrative embodiment of a game cleaning apparatus.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Figure 7:
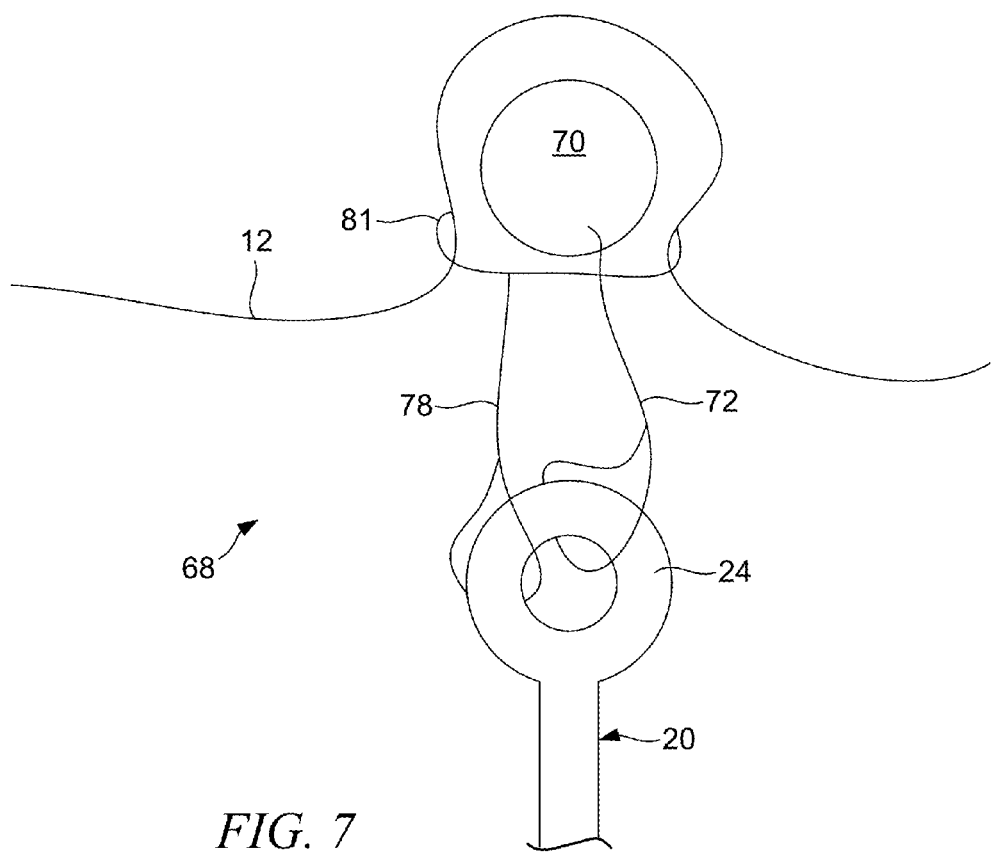
FIG. 7 shows an illustrative embodiment of a ball connector with loose hide extending away from an animal's body draped over a ball and a loop of a lariat extending about the hide below the ball, the lariat being formed with a tether separate from a tether coupled to the ball.
Figure 8:
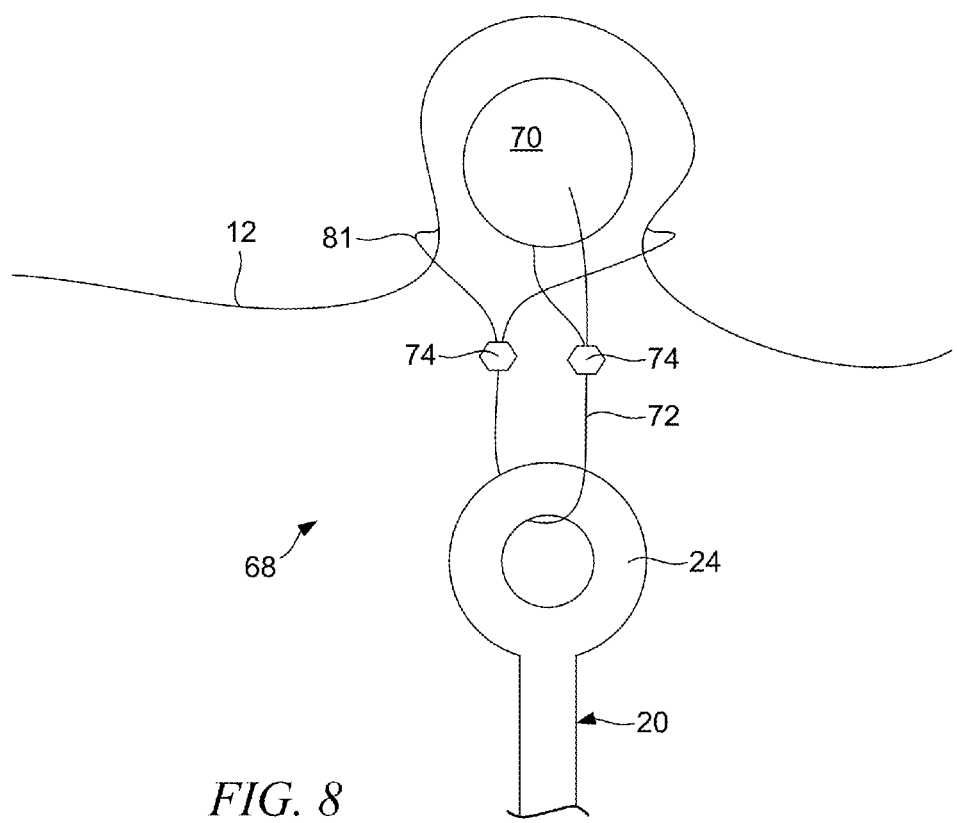
FIG. 8 shows an illustrative embodiment of a ball connector with loose hide extending away from an animal's body is draped over a ball and a loop of a lariat extending about the hide below the ball, the lariat being formed with a common tether that is also coupled to the ball.

Accordingly, there is a need in the art for a system and method to conveniently remove the hide from an animal carcass. An illustrative embodiment of a game cleaning apparatus 10 for removing a hide 12 (FIG. 3) from an animal 14 such as a deer is shown in a deployed state in FIG. 1. As shown, the game cleaning apparatus 10 includes a generally-rectangular base 16 formed from 2 in. square aluminum tube, but the invention can include a base 16 of any shape, formed from any suitably-durable material to withstand the forces exerted thereon while removing the hide 12 from an animal 14 as described below. At a proximate end 18 of the base 16 is a fastener 20, shown in the figures generally as an eye-bolt, that extends through the square tube of the frame 16 and is secured in place by a cooperating nut tightened on the opposite side of the frame tube relative to an eye portion 24 (FIGS. 7 and 8). Although described as an eye-bolt, the fastener 20 can be any other suitable fastener that allows removable connection of a hide gripper 26 described in detail below with reference to FIGS. 5-8, to the hide 12 or other portion of the animal 14.

A cross member 28 (FIGS. 1, 2 and 6) extending transversely between the proximate end 18 and a distal end 30 of the base 16 supports an optional pulley 36, cam, roller, wheel or any other suitable transitional lifting device (i.e., the cable 32 or other tether undergoes a change of direction about the transitional lifting device when elevating an animal or hide as described herein) about which a cable 32, rope or any other tether can at least partially extend to be strung to an elevated cross member 34. The pulley 36 is optional because the tether 32 can extend over another pulley 38 and be directly drawn over that pulley 38 by a driver 52 as described below without passing over the pulley 36. Like the frame 16, the cross member 28 and the elevated cross member 34 can be formed from 2 in. square aluminum tube, or any other suitable structural material. Another pulley 38, cam, roller wheel or any other suitable transitional lifting device about which the cable 32, rope or any other tether can at least partially travel to extend in a generally-downward direction is supported by the elevated cross member 34. The elevated cross member 34 is supported at a position vertically above the base 16 by laterally-spaced-apart uprights 40, and reinforced with fixed gussets 42 extending between the uprights 40 and the elevated cross member 34 to allow the elevated cross member 34 to withstand the forces imparted thereon when separating a hide 12 from an animal 14 as described herein. The height of the elevated cross member 34 can be any desired elevation suitable to remove at least a portion of the hide 12 from an animal 14. For example, the elevated cross member 34 can be supported approximately 98 inches, ±12 inches, from the base 16.

To facilitate stowing and transporting the game cleaning apparatus 10, each of the uprights 40 can be formed from a plurality of 2 in. square aluminum tube sections that can be coupled together by releasable connectors 39 that can be adjusted to couple the upright sections together, and then subsequently allow the upright sections to be separated. According to an embodiment, the releasable connectors 39 can each optionally include a coupler sleeve 29 and a plurality of pins 44 (FIGS. 1 and 2) that are to extend through the sleeve 29, and overlapping portions of each upright section within the sleeve that are to be joined together by that connector 39. The pins 44 coupling the lowermost sections of the uprights 40 to an adjacent section can also extend through an extension of pivotal gussets 46 (embodiment of FIG. 1) that provide support to the uprights 40, thereby preventing the uprights 40 from tipping when the apparatus 10 operates as described herein. The pivotal gussets 46 are said to be pivotal because they can pivot about a respective hinge pin 48 extending through spaced receiver plates 51 that couple the pivotal gussets 46 to the frame 16. Following removal of the pins 44 from the portion of the pivotal gussets 46 aligned with a portion of the uprights 40, the pivotal gussets 46 can be pivoted about pins 48 and collapsed into a stowed orientation where the lowermost portion of the uprights 40 can be laid down, to be substantially parallel to the base 16. When stowed, the game cleaning apparatus 10 is compact and can fit into a bag, box or other portable container that can optionally include a handle to be transported from one location to another.

A mounting plate 50 (FIG. 2) formed from aluminum, steel, metal alloy or other suitably durable material is provided adjacent the distal end 30 of the base 16. The mounting plate 50 can include apertures or other fastening features that cooperate with compatible fastening features of a driver 52 to couple the driver 52 to the game cleaning apparatus 10. Illustrative examples of the driver 52 include a winch driven by an electric or gas-powered motor, or any other device that can draw in the cable 32 or other tether as described below. Operation of the driver 52 can optionally be controlled via a wired or wireless remote control 54 that includes at least one of an up button, down button, and a stop button to control operation of the driver 52 as desired during removal of a hide 12 from an animal 14.

The cable 32 or other tether includes a connector such as a noose 35 (FIGS. 1 and 3), a deer gambrel 37 (FIG. 4), or other suitable connector that cooperates with a portion of the animal 14 to couple the animal 14 to the cable 32. The noose 35 can be formed from a terminal end of the cable 32, including a loop with a running knot that cinches the loop tighter when the opposite end of the cable 32 is pulled by the driver 52. According to the illustrative embodiment in FIG. 4, the gambrel 37 includes a generally triangular frame 61, with a pair of hooks 65 extending from opposite lateral sides thereof. In use, each hook 65 extends through a portion of the animal, such as between bones in the animal's hind legs, for example, to couple the animal 14 to the cable 32. The gambrel 37 can optionally include a receiver 67 such as an open loop that can clip onto the noose 35 or other compatible feature provided adjacent to the end of the cable 32. For such embodiments, the gambrel 37 can be quickly attached and removed from the cable 32 provided with a noose 35. According to alternate embodiments, the gambrel 37 can lack the receiver 67, and instead, receiver a portion of the cable 32 through an interior of the triangular frame 61 to couple the gambrel 37 to the cable 32. However, any suitable connector for coupling the animal 14 to the cable 32 can be used.

Figure 2:
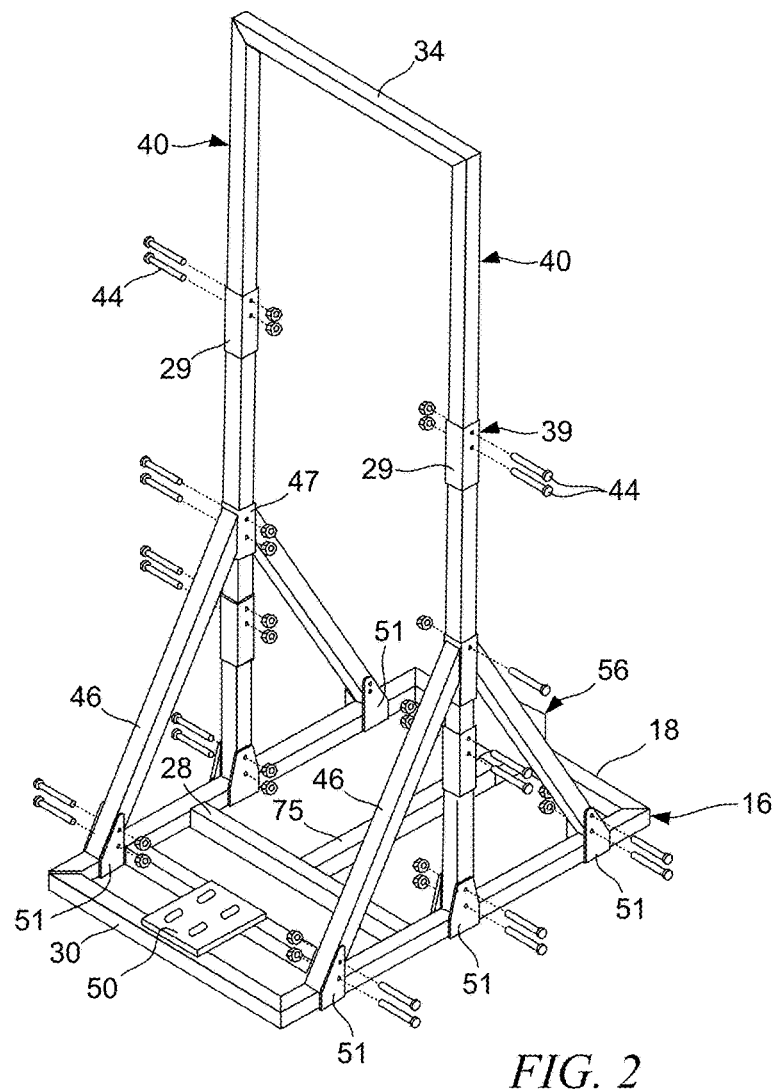
FIG. 2 shows a partially exploded view of an illustrative embodiment of a frame of a game cleaning apparatus.
Figure 5:
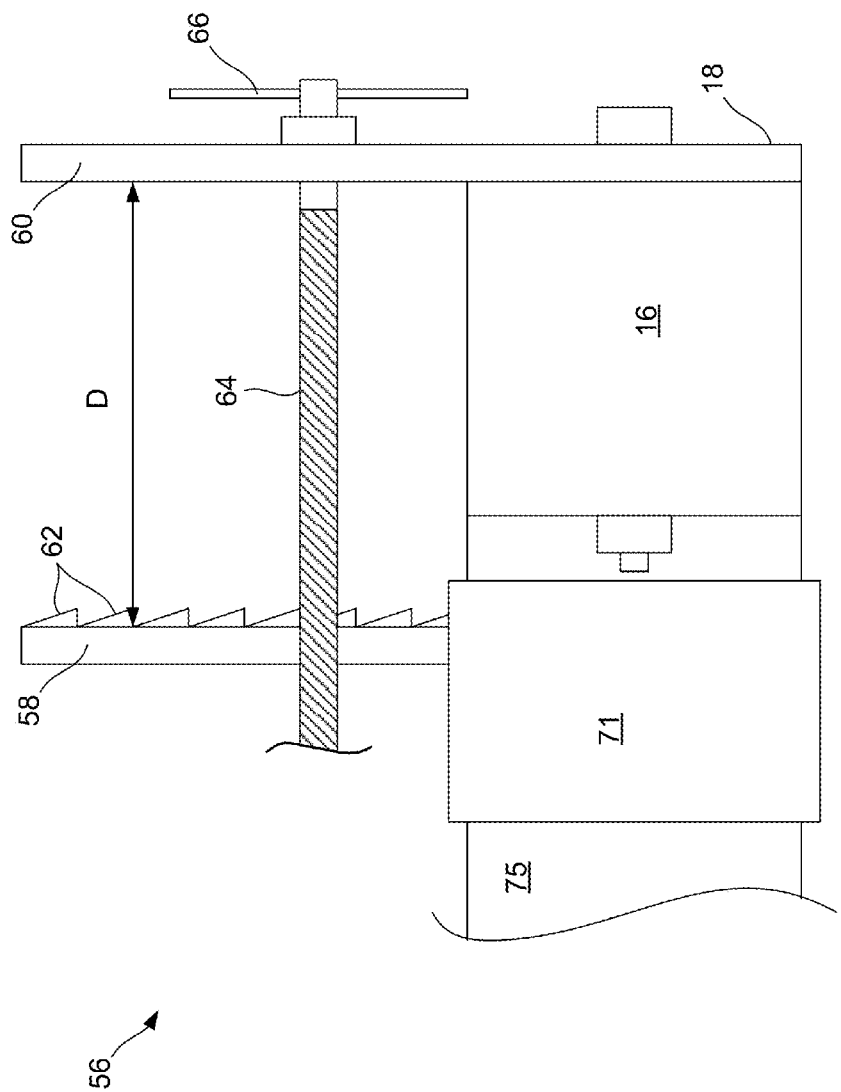
FIG. 5 shows a side view of a clamp provided to a game cleaning apparatus, where a lateral side member of a base has been removed to reveal a longitudinal guide member.
Figure 6:
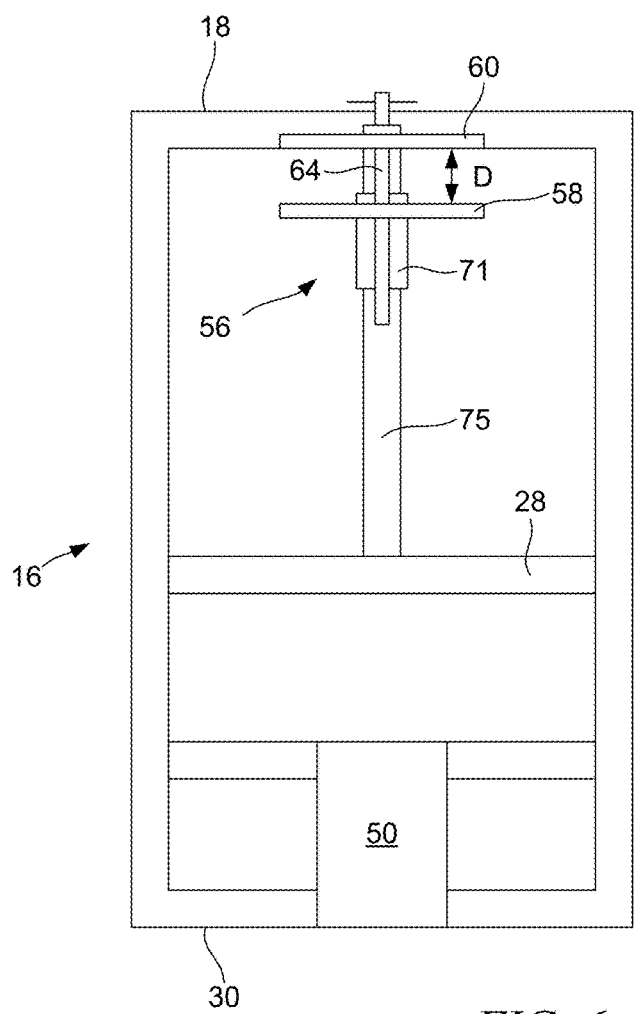
FIG. 6 shows a top view of an illustrative embodiment of a base of a game cleaning apparatus.

As shown in FIGS. 2, 5 and 6, the fastener 20 can be replaced by a clamp 56 including an adjustable jaw 58 that is laterally adjustable relative to a fixed jaw 60. The adjustable jaw 58 is coupled to a sleeve 71 that travels along a longitudinal guide member 75 provided to the base 16. At least one, and optionally both of the adjustable jaw 58 and the fixed jaw 60 includes a gripping feature such as angled teeth 62, for example, that resists slippage of the hide 12 from between the adjustable jaw 58 and the fixed jaw 60 when brought together to secure the hide 12 there between. A threaded member 64 extends through the fixed jaw 60 and an interior-threaded aperture in the adjustable jaw 58. When the threaded member 64 is rotated by a user grasping a handle 66, for example, the external threads provided to the threaded member 64 cooperate with the internal threads of the aperture formed in the adjustable jaw 58 to adjust the position of the adjustable jaw 58 relative to the fixed jaw 60, thereby adjusting the distance D separating those jaws 58, 60.

Although the game cleaning apparatus 10 is described herein as securing a portion of loose hide 12 from an animal 14 adjacent to the base 16 and lifting the animal 14, alternate embodiments can optionally involve securing a portion of the loose hide 12 at a desired elevation and pulling the animal downward. According to yet alternate embodiments, the animal 14 can be secured adjacent to the base, and a portion of loose hide 12 secured to the cable 32 or other tether to be pulled from the substantially-stationary animal 14. However, to describe operation of the game cleaning apparatus 10 below, an embodiment where the loose hide 12 is coupled adjacent to the base 16 and the animal 14 coupled to the cable 32 is elevated is described.

Figure 3:
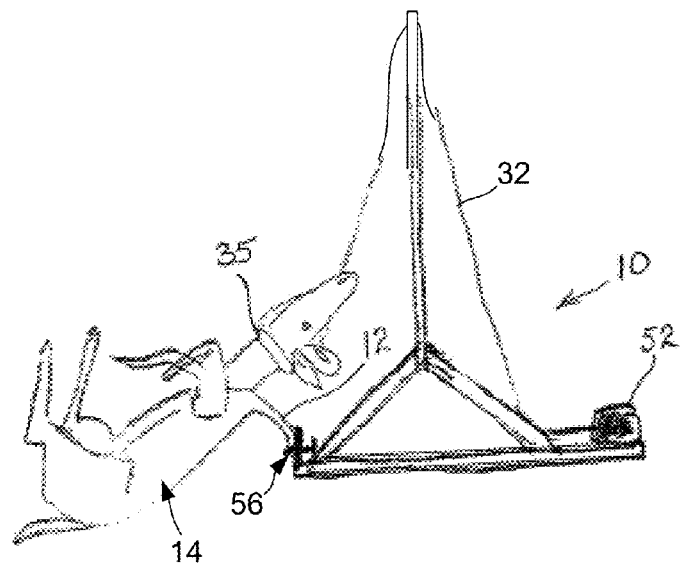
FIG. 3 shows an illustrative embodiment of a game cleaning apparatus with a tether cooperating with a neck of an animal to at least partially separate a hide from the animal.

In use, the game cleaning apparatus 10 can assist in the removal of the hide 12 from the animal 14 which, in FIG. 3, is shown as a deer. A portion of the hide 12 (identified as "Loose hide") in FIG. 3 is cut and peeled away from the animal 14, but not separated from the remaining hide 12 on the animal 14 that has yet to be removed. The portion of the hide 12 extending from the animal 14 is inserted between the jaws 58, 60 of the clamp 56 and the handle 66 adjusted to cause rotation of the threaded member 64. Rotation of the threaded member 64 causes the adjustable jaw 58 to move generally toward the fixed jaw 60 and compress the portion of the hide 12 inserted in the space between the jaws 58, 60 against the fixed jaw 60 (i.e., the distance D separating the jaws 58, 60 is lessened). The teeth 62 provided to the adjustable jaw 58 interfere with removal of the portion of the hide 12 from between the jaws 58, 60 when adjustment of the adjustable jaw 58 is complete and a large compressive force is exerted on the portion of the hide 12 clamped between the jaws 58, 60.

The noose 35, as the connector in the embodiment illustrated in FIG. 3, is placed around the animal's neck above the incision where the portion of the hide 12 is cut away from the animal 14. The winch or other driver 52 is activated to retract the cable 32 over pulleys 36, 38 and pull the animal 14 away from the clamp 56. As the animal 14 is elevated the animal is pulled away from the portion of the loose hide 12 secured by the clamp 56, at least some, and optionally a majority or the remainder of the hide 12 is pulled from the animal 14.

Figure 4:
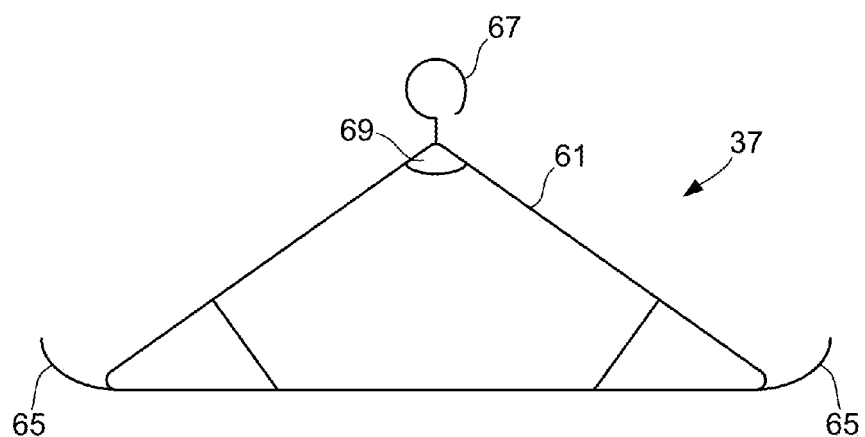
FIG. 4 shows an illustrative embodiment of a gambrel that can be used to couple an animal to a tether of a game cleaning apparatus.

According to an alternate embodiment described with reference to FIG. 4, the animal's hind legs can be coupled to the hooks 65 of the gambrel 37, which is used in the present embodiment to connect the animal 14 to the cable 32. A portion of the hide 12 partially cut away from the animal 14 can be adjacent to the animal's hind quarters to maximize separation of the animal 14 from the hide 12 as the animal 14 is elevated. Just as before, the loose hide 12 projecting from the animal 14 can again be secured in the clamp 56 as described above. The winch or other driver 52 is activated to retract the cable 32 and pull the gambrel 37, and accordingly, the animal 14 generally away from the clamp 57, thereby peeling the hide 12 from the animal 14 from the hind quarters toward the head.

According to yet other embodiments, shown in and described with reference to FIGS. 7 and 8, instead of employing the clamp 56, a ball connector 68 is coupled to the fastener 20 attached to the base 16 to secure the loose hide 12 to the base 16. According to the embodiment in FIG. 7, a ball 70 approximately the size of a golf ball is coupled at one end of a cable 72 or other suitable tether, which is coupled to the eye portion 24 of the connector 20 coupled to the base 16. A separate (i.e., in addition to the cable 72 tethering the ball 70 to the connector 20) cable 78 or other suitable tether forms a type of lariat, with a loop 81 at one end that can be cinched tight (i.e., a diameter of the loop 81 can be lessened when tension is applied to the cable 78). Thus, as the animal 14 is elevated through operation of the driver 52, tension resulting in the tether 78 cinches the lop 81, thereby interfering with removal of the loose hide 12 from over the ball 70.

According to an alternate embodiment shown in FIG. 8, the ball 70 and the loop 81 are arranged adjacent to opposite ends of a common cable 72. For such an embodiment, a hole can be drilled through the ball 70 and a first end of the cable 72 passed there through. The first end of the cable 72 can be doubled back on itself, and secured to the segment of the cable 72 on an opposite side of the ball, in essence forming a loop that extends through the ball 70. A cable clamp 74 or other suitable fastener cooperates with the portions of the cable 72 on opposite sides of the ball 70, thereby securing the ball 70 to the cable 72. Likewise, the loop 81 can be formed adjacent to an opposite end of the cable 72. Accordingly, a portion of the cable 72 is doubled back on itself, and an adjustable fastener that allows a length of the cable 72 forming the loop 81 to be adjusted in a manner analogous to a running knot. Thus, when the cable 72 is placed in tension the diameter of the loop 81 becomes smaller than before tension was applied, thereby cinching the loop 81 about the portion of the hide 12 draped over the ball 70, and interfering with removal of the hide 12 from the ball 70. Thus, when the driver 52 is activated, tension applied to the cable 72 as the animal 14 is elevated cinches the loop 81 about the hide blanketing the ball 70, causing the diameter of the loop 81 to be smaller than the diameter of the ball 70. This cinching of the loop 81 over the ball 70 holds the hide 12 in place, causing the hide 12 to be peeled from the animal 14 as it is elevated by the driver 52.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus for removing a portion of a hide from an animal, the apparatus comprising:
   a base;
   a tether that is adjustable relative to the base;
   a hide connector that cooperates with a portion of loose hide that extends from the animal, but is connected to a remaining portion of the hide on the animal that is to be removed, wherein the hide connector comprises at least one of (i) a clamp assembly with at least one adjustable jaw that is adjustable to exert a compressive force on a portion of the hide and (ii) a ball and a loop with an adjustable diameter that is to extend around the portion of loose hide draped over the ball;

an animal connector that cooperates with a portion of the animal, wherein a first one of the hide connector and the animal connector is coupled to the base and another one of the hide connector and the animal connector is coupled to the tether; and a motor-driven winch that is operable to adjust a position of the tether relative to the base and cause separation of the hide connector and the animal connector, thereby removing at least some of the remaining portion of the hide from the animal.

2. The apparatus of claim 1, wherein the hide connector is coupled to the base at a generally-fixed location relative to the base, the animal connector is coupled to the tether, and operation of the motor-driven winch applies tension on the tether to separate the animal connector from the hide connector and pull the animal generally away from the hide connector.

3. The apparatus of claim 1 further comprising a remote control operatively connected to a motor of the motor-driven winch to receive input commands from a user remotely located from the apparatus and control operation of the motor in response to said input commands.

4. The apparatus of claim 1 further comprising:
at least one upright supported by the base to extend generally upwardly, away from the base, wherein
each of the uprights comprises a plurality of separate upright segments that can be repeatedly assembled, held together by releasable fasteners and then subsequently disassembled into a collection of parts that can fit into a portable carrying container to be transported from one location to another, and
a portion of the tether is to be suspended adjacent to an elevated portion of the upright and operation of the driver causes at least one of the portion of loose hide and the animal to be pulled toward a plane of the elevated portion of the upright above the base.

5. The apparatus of claim 4 further comprising:
an elevated member supported adjacent to the elevated portion of the upright; and
a transitional lifting device supported by said elevated member, wherein
the tether extends at least partially over the transitional lifting device between the driver and the animal connector.

6. The apparatus of claim 5, wherein the transitional lifting device comprises a pulley suspended from the elevated member.

7. An apparatus for removing a portion of a hide from an animal, the apparatus comprising:
a base;
a plurality of uprights that extend in an upward direction when assembled, generally away from the base, each of the uprights comprising a plurality of upright segments that can be repeatedly assembled and held together by releasable fasteners and then subsequently disassembled into a collection of parts that can fit into a portable carrying container to be transported from one location to another;
an elevated member supported adjacent to an elevated portion of the uprights in a plane disposed vertically above a plane of the base;
a pulley supported by the elevated member;
a tether that extends over the pulley and comprises a first connector adjacent to a distal end of the tether;
a second connector coupled to the base at a generally-fixed location relative to the base; and
a driver that is operable to apply a tensile force to the tether extending over the pulley and elevate the first connector provided adjacent to the distal end of the tether, thereby causing separation of the first and second connectors.

8. The apparatus of claim 7, wherein the first connector is an animal connector that cooperates with a portion of the animal to be separated from the hide, and the second connector is a hide connector that cooperates with a portion of loose hide extending from the animal but connected to a portion of remaining hide on the animal to be removed by operation of the driver.

9. The apparatus of claim 8, wherein the first connector comprises a loop that is to extend around a portion of the animal or a gambrel.

10. The apparatus of claim 9, wherein the second connector comprises a clamp comprising at least one adjustable jaw that can be adjusted toward another jaw to apply a compressive force on the portion of loose hide.

11. The apparatus of claim 9, wherein the second connector comprises a ball and a loop with an adjustable diameter that is to extend around the portion of loose hide draped over the ball.

12. The apparatus of claim 7, wherein the second connector is an animal connector that cooperates with a portion of the animal to be separated from the hide, and the first connector is a hide connector that cooperates with a portion of loose hide extending from the animal but connected to a portion of remaining hide on the animal to be removed by operation of the driver.

13. The apparatus of claim 7 further comprising a second pulley provided adjacent to the base, for cooperation with a portion of the tether between the pulley and the driver.

14. The apparatus of claim 7, wherein the driver comprises a motor-driven winch.

* * * * *